US 7,151,756 B1

(12) United States Patent
Park et al.

(10) Patent No.: US 7,151,756 B1
(45) Date of Patent: Dec. 19, 2006

(54) HARD HANDOFF METHOD BETWEEN AN ASYNCHRONOUS CDMA SYSTEM AND A SYNCHRONOUS CDMA SYSTEM

(75) Inventors: Kyu Tae Park, Taejon (KR); Kwang Ryul Jung, Kyonggi-do (KR); Pyon Jung Song, Taejon (KR); Sun Bae Lim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/499,933

(22) Filed: Feb. 8, 2000

(30) Foreign Application Priority Data

Dec. 14, 1999 (KR) ............................... 1999-57673

(51) Int. Cl.
*H04Q 7/00* (2006.01)
(52) U.S. Cl. .................. 370/331; 370/335; 370/336; 370/338; 370/339; 370/342; 370/350; 455/436; 455/502
(58) Field of Classification Search ............. 370/252, 370/328, 331–339, 342, 350, 479, 513, 514; 455/436–448, 502, 504, 517, 524
See application file for complete search history.

(56) References Cited

U.S. PATENT DOCUMENTS 5,805,575 A * 9/1998 Kamin, Jr. .................. 370/335
5,901,145 A   5/1999 Sawyer ....................... 370/332

(Continued)

FOREIGN PATENT DOCUMENTS

JP          11-285048      10/1999

(Continued)

OTHER PUBLICATIONS

Huang, Cheonhong, Ph.D., "An Analysis of CDMA 3G Wireless Communications Standards," *IEEE*, 1999.

*Primary Examiner*—Steven Nguyen
*Assistant Examiner*—Roberta Shand
(74) *Attorney, Agent, or Firm*—Seed IP Law Group PLLC

(57) ABSTRACT

A hard handoff method between asynchronous CDMA (code division multiple access) system and synchronous CDMA system is provided. A hard handoff method between asynchronous CDMA (code division multiple access) system and synchronous CDMA system in accordance with an embodiment of the present invention includes following steps. First step is to transmit asynchronous CDMA channels from synchronous CDMA base stations with a purpose of synchronizing handoff time at synchronous CDMA base station and code used at synchronous CDMA base station. The transmission is done by a mobile terminal that is in communication with an asynchronous CDMA base station. The transmission is a part of handoff process and the mobile terminal performs hard handoff to synchronous CDMA base station. Second step is to report measured result to the asynchronous CDMA base station on the basis of intensity of asynchronous CDMA pilot channel received from an adjacent synchronous CDMA base station. The reporting is done by the mobile terminal. Third step is to transmit handoff request message to the synchronous CDMA base station on the basis of the measured result. The transmission is done by the asynchronous CDMA base station. Fourth step is to transmit information necessary for handoff to the asynchronous CDMA base station. The transmission is done by the synchronous CDMA base station that receives the handoff request message. Fifth step is to perform hard handoff to the synchronous CDMA base station. The hard handoff is performed by the mobile terminal that receives the information through a traffic channel from the asynchronous CDMA base station.

11 Claims, 4 Drawing Sheets

U.S. PATENT DOCUMENTS

| | | | |
|---|---|---|---|
| 6,018,667 A * | 1/2000 | Ghosh et al. | 455/502 |
| 6,078,571 A * | 6/2000 | Hall | 370/331 |
| 6,198,937 B1 * | 3/2001 | DeClerck et al. | 455/517 |
| 6,216,004 B1 * | 4/2001 | Tiedemann et al. | 455/442 |
| 6,246,673 B1 * | 6/2001 | Tiedemann, Jr. et al. | 370/333 |
| 6,307,840 B1 * | 10/2001 | Wheatley, Jr. et al. | 370/252 |
| 6,546,247 B1 * | 4/2003 | Foti et al. | 455/433 |
| 6,567,666 B1 * | 5/2003 | Czaja et al. | 455/442 |
| 6,804,519 B1 * | 10/2004 | Czaja et al. | 455/442 |
| 2002/0037726 A1 * | 3/2002 | Czaja et al. | 455/442 |

FOREIGN PATENT DOCUMENTS

| | | |
|---|---|---|
| WO | WO 99/16261 | 4/1999 |
| WO | WO 99/23847 | 5/1999 |

* cited by examiner

HARD HANDOFF METHOD BETWEEN AN ASYNCHRONOUS CDMA SYSTEM AND A SYNCHRONOUS CDMA SYSTEM

TECHNICAL FIELD

The present invention relates to a hard handoff method between an asynchronous CDMA (Code Division Multiple Access) system and a synchronous CDMA system, which receives all necessary information for the handoff with a synchronous CDMA base station (especially, second generation IS95 base station) without disconnecting communication with an asynchronous CDMA base station (especially, third generation 3GPP DS base station).

BACKGROUND OF THE INVENTION

Conventional handoff method is restricted within the handoff of identical systems and assumes that mobile terminals and a network are synchronized by GPS (Global Positioning System). This assumption is no longer valid because the third generation 3GPP (Global Partnership Project) DS (Direct Spreading) system works at an asynchronous mode.

To make the handoff between a mobile terminal communicating with the third generation 3GPP DS system and the second generation IS95 system, a connection with the third generation 3GPP DS system must be terminated beforehand. It is because 3GPP DS systems work on the asynchronous mode and IS95 synchronous information cannot be transmitted to the mobile terminal.

Consequently, handoff success rate drops because acquiring pilot channel of second generation IS95 system, interpreting synchronous channel message, and establishing traffic channels have to be performed and therefore mobile terminals stay in disconnected state for a relatively longtime.

SUMMARY OF THE INVENTION

A hard handoff method between an asynchronous CDMA (Code Division Multiple Access) system and a synchronous CDMA system is provided.

A hard handoff method between the asynchronous CDMA system and the synchronous CDMA system in accordance with an embodiment of the present invention includes following steps. A first step is to transmit asynchronous CDMA channels from the synchronous CDMA base stations with a purpose of synchronizing a handoff time at the synchronous CDMA base station and a code used at the synchronous CDMA base station. The transmission is done by a mobile terminal that is in communication with an asynchronous CDMA base station. The transmission is a part of handoff process and the mobile terminal performs the hard handoff to the synchronous CDMA base station. A second step is to report a measured result to the asynchronous CDMA base station on the basis of an intensity of an asynchronous CDMA pilot channel received from an adjacent synchronous CDMA base station. The reporting is done by the mobile terminal. A third step is to transmit a handoff request message to the synchronous CDMA base station on the basis of the measured result. The transmission is done by the asynchronous CDMA base station. A fourth step is to transmit an information necessary for handoff to the asynchronous CDMA base station. The transmission is done by the synchronous CDMA base station that receives the handoff request message. A fifth step is to perform the hard handoff to the synchronous CDMA base station. The hard handoff is performed by the mobile terminal that receives the information through a traffic channel from the asynchronous CDMA base station.

Preferably, the first step includes following steps. A first step is to transmit an asynchronous CDMA synchronization channel and a common pilot channel. A second step is to synchronize the asynchronous CDMA synchronization channel and the common pilot channel with a starting point of an synchronous pilot channel, the synchronous pilot channel being transmitted from the synchronous CDMA base station.

Preferably, the second step includes following steps. A first step is to measure an intensity of signals received from the asynchronous CDMA base station and the adjacent synchronous CDMA base station using the asynchronous CDMA synchronization channel and the common pilot channel. The measurement is done by the mobile terminal that is in communication with the asynchronous CDMA base station. A second step is to report the intensity of signals and an information regarding the synchronous CDMA base station. The report is done by the mobile terminal if the intensity of signals received from the synchronous CDMA base station is bigger than an intensity of signals received from the asynchronous CDMA base station by a predetermined value. A third step is to return to the measuring step if the intensity of signals received from the synchronous CDMA base station is not bigger than the intensity of signals received from the asynchronous CDMA base station by the predetermined value.

Preferably, the information necessary to perform the handoff includes a starting point of the hard handoff, a long code state at the starting point of the hard handoff, an offset index of a pilot PN (Pseudo Noise) sequence, a code channel index used in forward traffic channel, and an offset value regarding the traffic channel.

Preferably, the fifth step includes following steps. A first step is to receive the information from the asynchronous CDMA base station through a traffic channel A second step is to release the traffic channel established with the asynchronous CDMA base station and establish a traffic channel with the synchronous CDMA base station. A third step is to exchange an available frame between the mobile terminal and the synchronous CDMA base station through the established traffic channel and confirm a handoff completion. A fourth step is to release resources between the asynchronous CDMA base station and a switch. The synchronous CDMA base station reports the handoff completion to the switch.

Preferably, the traffic channel is established between the mobile terminal and the synchronous CDMA base station using the starting point of the hard handoff, the long code state at the starting point of the hard handoff, the offset index of the pilot PN sequence, the code channel index used in the forward traffic channel, and the offset value regarding the traffic channel.

Preferably, the starting point of the hard handoff is determined by calculating how many frames of the common pilot channel have passed at the asynchronous CDMA base station from the moment when the mobile terminal receives information.

A computer readable medium for recording program, which provides a hard handoff method in a CDMA system being equipped with microprocessors is provided. The program includes following steps. A step is to report a measured result to an asynchronous CDMA base station on the basis of an intensity of an asynchronous CDMA pilot channel received from an adjacent synchronous CDMA base station. The reporting is done by a mobile terminal. A step is to transmit a handoff request message to the synchronous CDMA base station on the basis of the measured result. A step is to transmit an information to the asynchronous CDMA base station. The transmission is done by the synchronous CDMA base station that receives the handoff request message. A step is to perform a hard handoff to the synchronous CDMA base station. The hard handoff is performed by the mobile terminal that receives the information through a traffic channel from the asynchronous CDMA base station.

BRIEF DESCRIPTION OF THE DRAWINGS

The embodiments of the present invention will be explained with reference to the accompanying drawings, in which.

DETAILED DESCRIPTION OF THE INVENTION

A hard handoff method in accordance with an embodiment of the present invention supports reliable handoff between a base station of asynchronous CDMA system, especially, asynchronous third generation 3GPP DS system, and a base station of synchronous CDMA system, especially second generation IS95 system. In the method in accordance with an embodiment of the present invention, the mobile terminal communication with a third generation 3GPP DS system measures intensity of received signals from a second generation IS95 system and reports the result to the third generation 3GPP DS system. Also, a hard handoff method in accordance with an embodiment of the present invention determines whether handoff between a third generation 3GPP DS system and a second generation IS95 system is necessary on the basis of the reported information. At the moment, a base station of the second generation IS95 system provides necessary information for handoff to the base station of the third generation 3GPP DS system. The mobile terminal receives the information through the 3GPP DS system that is currently under communication with the mobile terminal and performs hard handoff to the base station of the second generation IS95 system.

For the method stated above, a base station of second generation IS95 adjacent to a base station of third generation 3GPP DS transmits synchronization channel and common pilot channel of the base station third generation 3GPP DS additionally.

Figure 1:
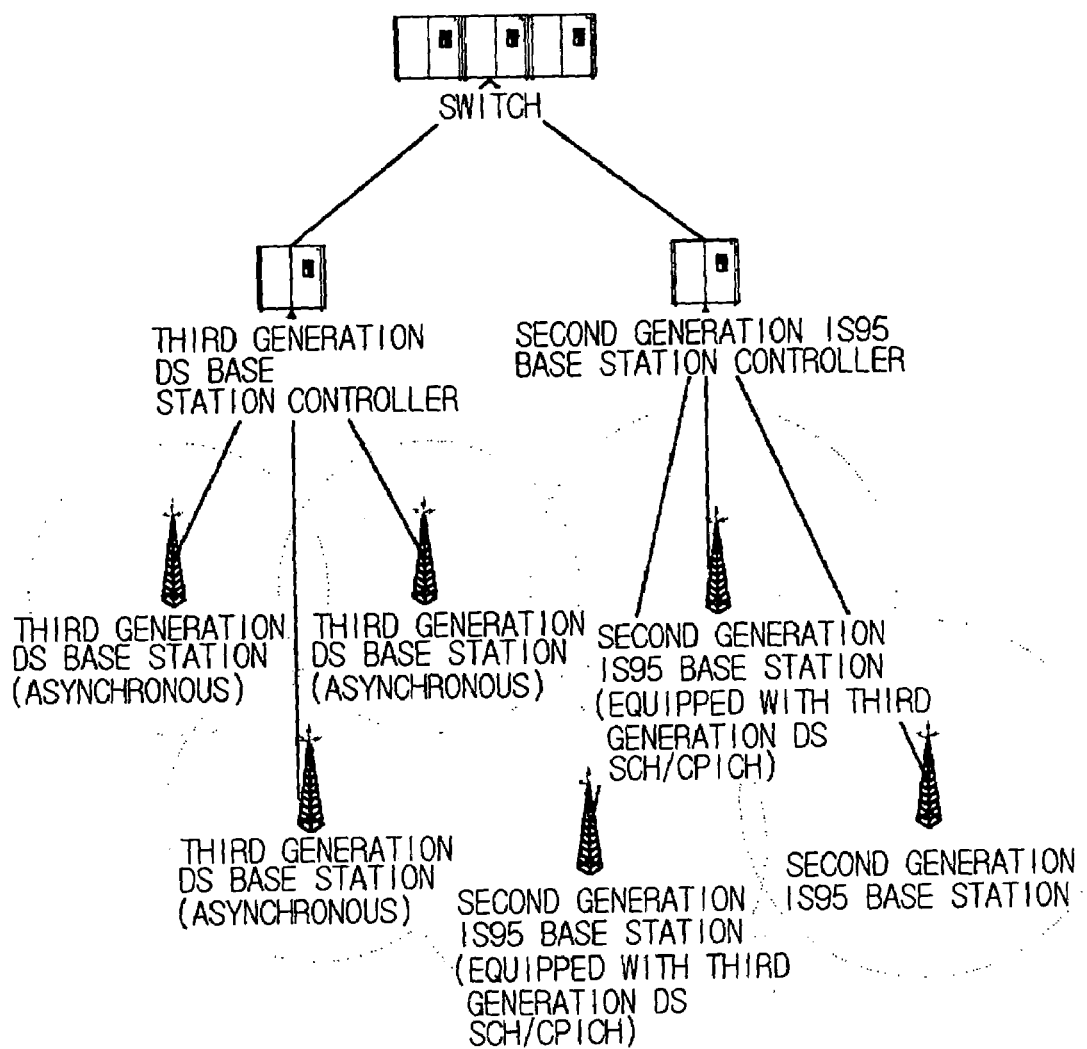
FIG. 1 is a diagram illustrating a wireless communication network in which the method in accordance with an embodiment of the present invention is applied.

FIG. 1 is a diagram illustrating a wireless communication network in which the method in accordance with an embodiment of the present invention is applied.

Handoff is required for cases in which a base station of second generation IS95 is installed to be adjacent to a base station of third generation 3GPP DS. Handoff is not needed for communications between base stations of second generation IS95. Likewise, handoff is not needed for communications between base stations of third generation 3GPP DS.

Figure 2:
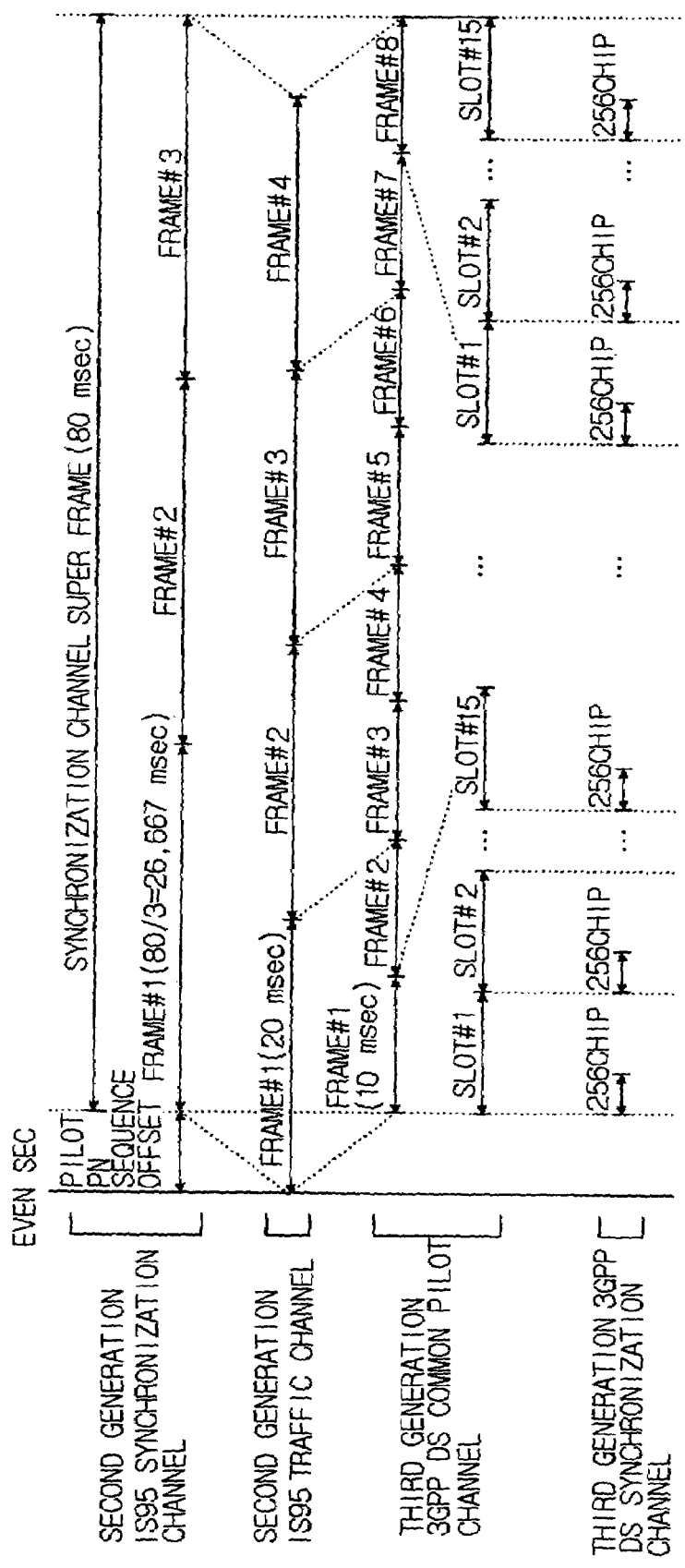
FIG. 2 is a timing diagram illustrating channels transmitted between an asynchronous CDMA base station and a synchronous CDMA base station.

FIG. 2 is a timing diagram illustrating channels transmitted between an asynchronous CDMA base station and a synchronous CDMA base station. A base station of second generation IS95 system adjacent to a base station of third generation 3GPP DS system transmits synchronization channel of 3GPP DS, common pilot channel, second generation IS95 channel. FIG. 2 shows relations of transmission starting points among synchronization channel of 3GPP DS, common pilot channel, second generation IS95 channel.

Third generation 3GPP DS synchronization channel and common pilot channel are synchronized with a starting point of second generation IS95 pilot channel. Third generation 3GPP DS synchronization channel and common pilot channel are delayed by PN (Pseudo Noise) offset from even second and then transmitted. Third generation 3GPP DS common pilot channel of 10 msec iterates eight times in second generation IS95 synchronization channel super frame. The reason why third generation 3GPP DS synchronization channel is synchronized and then transmitted with pilot channel in synchronous second generation IS95 base station is that a synchronization for handoff performance is required between a network and a terminal.

Figure 3:
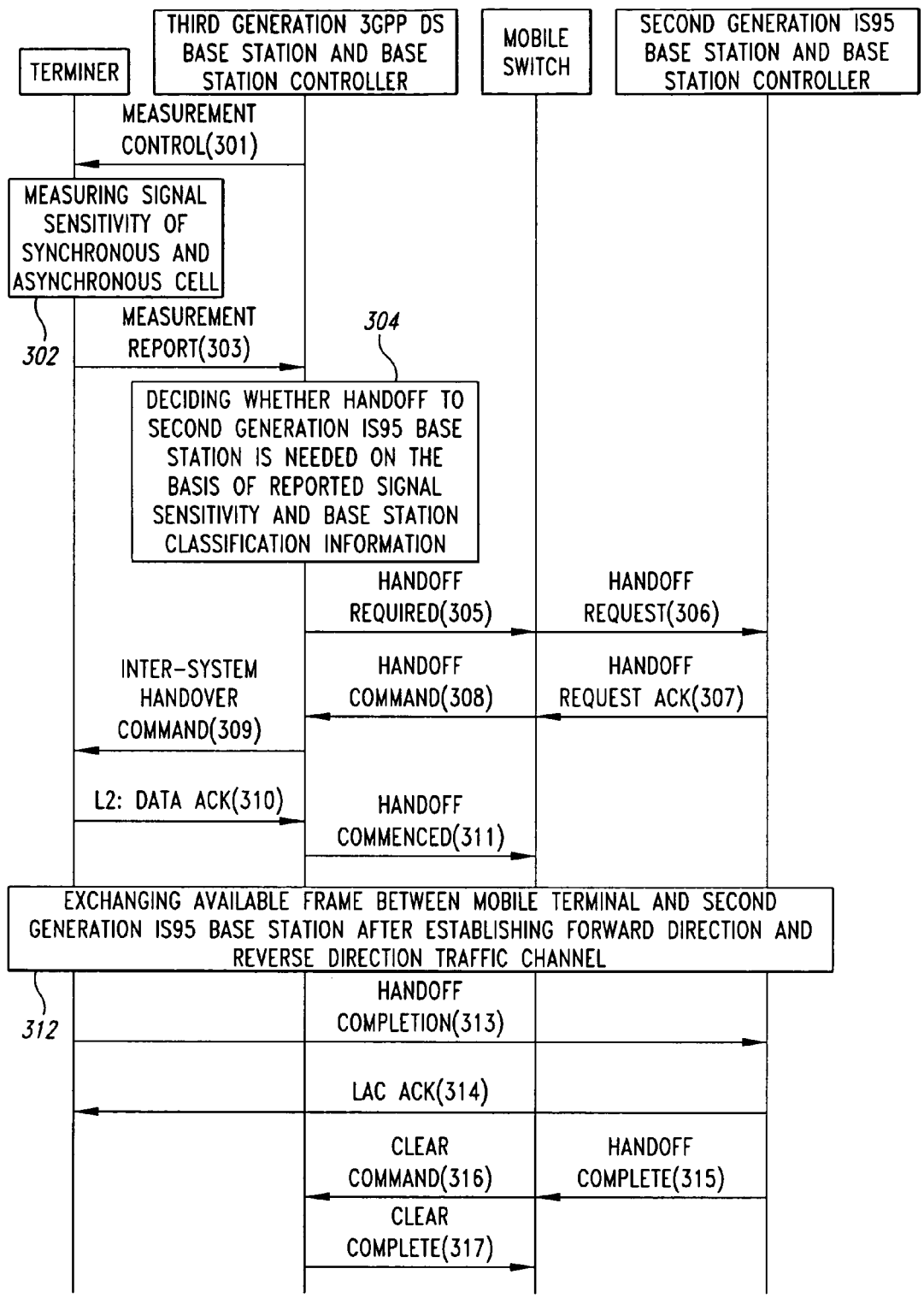
FIG. 3 is a diagram illustrating an embodiment of the present invention.

FIG. 3 is a diagram illustrating an embodiment of the present invention.

A mobile terminal communicates with a base station of third generation 3GPP DS through a dedicated physical channel and monitors common pilot channel and synchronization channel of other base stations adjacent to the base station of a third generation 3GPP DS at step 301. The mobile terminal measures intensity of asynchronous cells and synchronous cells at step 302. When a condition is satisfied for a report, for example, if the intensity of asynchronous cells and synchronous cells is bigger than signal intensity of currently communicating base station by a certain value, the mobile terminal reports the intensity of asynchronous cells and synchronous cells and information regarding which base stations are related with the intensity to the network at step 303. This report is named measurement report.

An asynchronous third generation 3GPP DS system uses the intensity and the information reported by the mobile terminal and determines whether handoff is to be performed and which base station performs handoff. If the information indicates a second generation IS95 base station, the network recognizes that handoff is required for the second generation IS95 base station at step 304.

When a third generation 3GPP DS base station notifies a request of handoff to a switch (Handoff required) at step 305, the switch notifies a request of handoff to a second generation IS95 base station (Handoff request) at step 306.

After receiving the request messages, the second generation IS95 base station transmits the necessary information for handoff to the third generation 3GPP DS base station at step 307 and 308. The necessary information includes information regarding when handoff is performed, long code state at the moment of handoff, offset index of pilot PN sequence with 64 chip unit, code channel index used for forward direction traffic channel, and offset value if offset is applied to traffic channel (Handoff Request ACK, Handoff Command).

The third generation 3GPP DS base station transmits the information received from a second generation IS95 base station to the mobile terminal through the established signal channel at step 309 (Inter-System Handoff Command). Once the mobile terminal receives the inter-system handoff command successfully, the mobile terminal notifies it to the third generation 3GPP DS base station at step 310 (link layer confirmation response (L2: Data Ack)). Then, the third generation 3GPP DS base station sends handoff commenced message to the switch at step 311.

The mobile terminal receiving Inter-System Handoff Command confirms when handoff is performed on the basis of information contained in the message. The starting point for handoff is determined with 10 ms unit after the message is received. The mobile terminal establishes forward direction traffic channel or reverse direction traffic channel on the basis of information such as long code state at handoff, offset index of pilot PN sequence with 64 chip unit, code channel index used for forward direction traffic channel, and offset value if offset is applied to traffic channel. When available frame is received through the established traffic channel, hard handoff between the third generation 3GPP DS base station and the second IS95 base station is successfully completed at step 312. The mobile terminal transmits handoff completion message to the second generation IS95 base station at step 313 and the message notifies requested handoff is done successfully.

After receiving a report saying that handoff is successfully completed, the second generation IS95 base station notifies that it received handoff completion message successfully to the mobile terminal at step 314 (LAC ACK). Then, resources held for communication with the mobile terminal in third generation 3GPP DS network are released. That is, the second generation IS95 base station notifies mobile switch that the handoff is completed (Handoff Complete) at step 315. When the mobile switch requests the third generation 3GPP DS base station to release resources (Clear Command) at step 316, the third generation 3GPP DS base station releases the resources and notifies the release to mobile switch (Clear Complete) at step 317.

Figure 4:
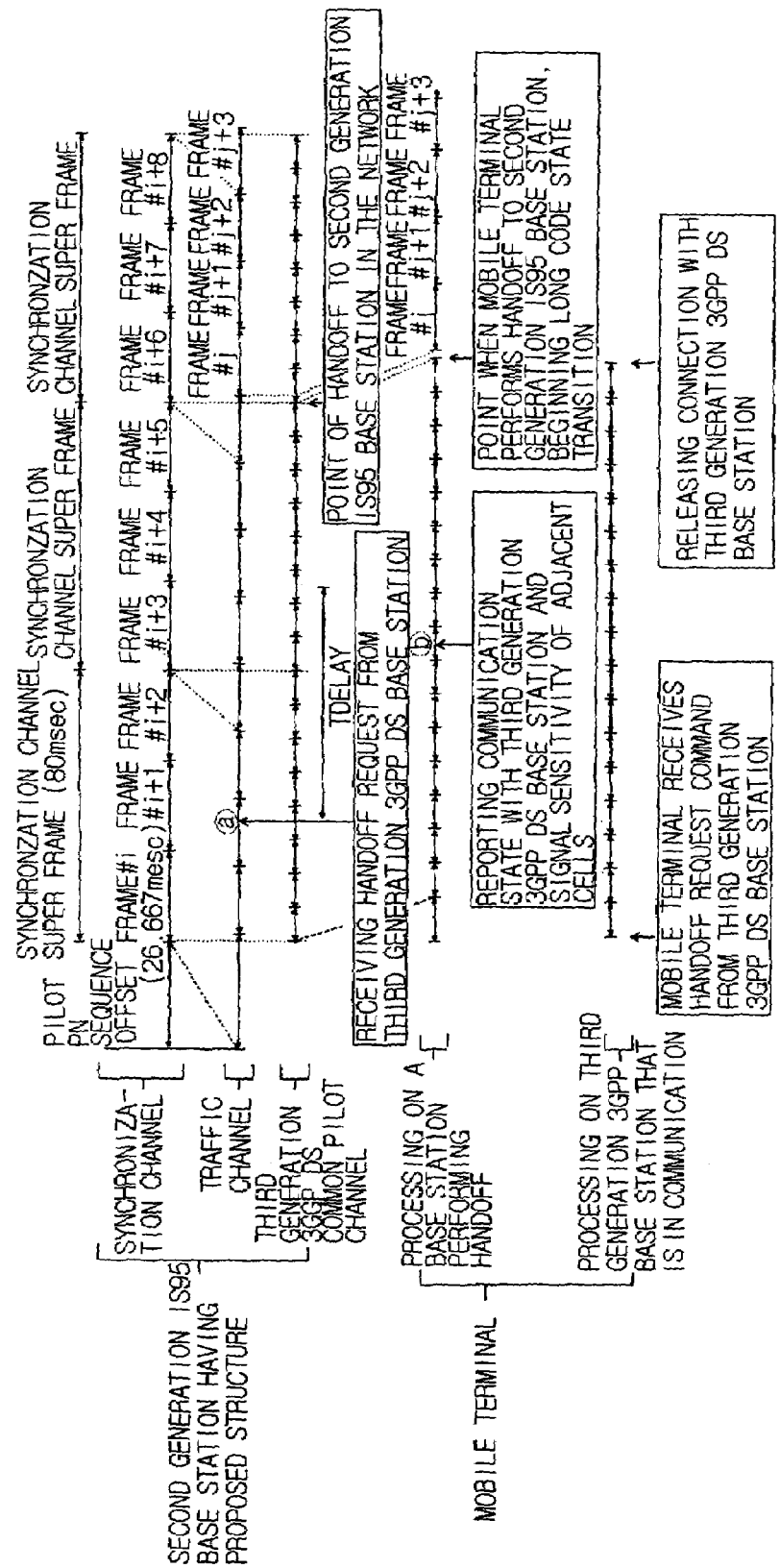
FIG. 4 is a flow diagram illustrating a handoff method between an asynchronous CDMA system and a synchronous CDMA system in accordance with an embodiment of the present invention.

FIG. 4 is a flow diagram illustrating a handoff method between asynchronous CDMA system and synchronous CDMA system in accordance with an embodiment of the present invention.

Even though a mobile terminal in communication with a third generation 3GPP DS base station doesn't recognize a second generation IS95 base station, it maintains 10 msec time information for measuring signal intensity of common pilot channel transmitted from the second generation IS95 base station. As shown in FIG. 2, the 10 msec channel is transmitted with the second generation IS95 synchronization channel super frame (80 msec) using the same starting point. In this case, starting point of the third generation 3GPP common pilot channel and starting point of the second generation IS95 synchronization channel super frame are identical in 80 msec unit.

In an embodiment of the present invention, timing for handoff between a mobile terminal and a second generation IS95 base station is synchronized in 10 msec frame of the third generation 3GPP DS common pilot channel.

At of FIG. 4, a second generation IS95 base station receiving handoff request selects the closest 80 msec starting point that is bigger than delay occurred between the network and wireless range. Then, the second generation IS95 base station calculates how many third generation 3GPP DS common pilot channel frames of 10 msec have passed. The second generation IS95 base station transmits handoff confirmation message to the third generation 3GPP DS base station. The handoff confirmation message includes the calculated value, long code state at the moment, offset index of pilot PN sequence with 64 chip unit, code channel index used for forward direction traffic channel, and offset value if offset is applied to traffic channel. The third generation 3GPP DS base station receives the message and passes it to the mobile terminal through established signal channel.

At of FIG. 4, the mobile terminal receives the information by way of handoff message and performs handoff with the received information after a certain number of common pilot channel (10 msec) frames passes. The number of frames is determined by the second generation IS95 base station.

As stated above, a hard handoff method in accordance with an embodiment of the present invention supports reliable handoff between a base station of asynchronous CDMA system, e.g., asynchronous third generation 3GPP DS system, and a base station of synchronous CDMA system, e.g., second generation IS95 system. A handoff with a second generation IS95 base station is performed at a particular time specified by the network after necessary information is received without disconnecting communication with a third generation 3GPP DS station. Therefore, time frame for disconnected state gets minimized and hard handoff success rate between a third generation 3GPP DS system and a second generation IS95 system is significantly improved.

Although representative embodiments of the present invention have been disclosed for illustrative purpose, those who are skilled in the art will appreciate that various modifications, additions and substitutions are possible without departing from the scope and spirit of the present invention as defined in the accompanying claims.

We claim:

1. A hard handoff method from an asynchronous CDMA base station to a synchronous CDMA base station, comprising:
   a first step of, at the synchronous CDMA base station, transmitting asynchronous CDMA channels including an asynchronous CDMA synchronization channel and an asynchronous CDMA common pilot channel to a mobile terminal communicated with the asynchronous CDMA base station for synchronizing a handoff time at the synchronous CDMA base station, wherein the synchronous CDMA base station further transmits synchronous CDMA channels to another mobile terminal;
   a second step of, at the mobile terminal, measuring each intensity of the asynchronous CDMA common pilot channels outputted from the synchronous CDMA base station and the asynchronous CDMA base station to report the measured result to the asynchronous CDMA base station;
   a third step of, at the asynchronous CDMA base station, transmitting a handoff request message to the synchronous CDMA base station on the basis of the result reported from the mobile terminal;
   a fourth step of, at the synchronous CDMA base station which receives the handoff request message, transmitting an information to the asynchronous CDMA base station, wherein the information is necessary to perform the hard handoff; and
   a fifth step of, at the mobile terminal, performing the hard handoff from the asynchronous CDMA base station to the synchronous CDMA base station in response to the information received from the asynchronous CDMA base station through a traffic channel.

2. The hard handoff method of claim 1, wherein the first step comprises:
   transmitting the asynchronous CDMA synchronization channel and the asynchronous CDMA common pilot channel; and synchronizing the asynchronous CDMA synchronization channel and the asynchronous CDMA common pilot channel with a starting point of a synchronous pilot channel transmitted from the synchronous CDMA base station.

3. The hard handoff method of claim 1, wherein the second step comprises:
measuring an intensity of signals received from the asynchronous CDMA base station and the synchronous CDMA base station using the asynchronous CDMA synchronization channel and the asynchronous CDMA common pilot channel;
reporting the intensity of signals and an information regarding the synchronous CDMA base station if the intensity of signals received from the synchronous CDMA base station is bigger than an intensity of signals received from the asynchronous CDMA base station by a predetermined value; and
returning to the measuring step if the intensity of signals received from the synchronous CDMA base station is not bigger than the intensity of signals received from the asynchronous CDMA base station by the predetermined value.

4. The hard handoff method of claim 1, wherein the information necessary to perform the handoff includes a starting point of the hard handoff, a long code state at the starting point of the hard handoff, an offset index of a pilot PN (pseudo noise) sequence, a code channel index used in a forward traffic channel, and an offset value regarding the traffic channel.

5. The hard handoff method of claim 1, wherein the fifth step comprises:
receiving the information from the asynchronous CDMA base station through the traffic channel;
releasing the traffic channel established with the asynchronous CDMA base station and establishing a traffic channel with the synchronous CDMA base station;
exchanging an available frame between the mobile terminal and the synchronous CDMA base station through the established traffic channel and confirming a handoff completion; and
releasing resources between the asynchronous CDMA base station and a switch, the synchronous CDMA base station reporting the handoff completion to the switch.

6. The hard handoff method of claim 5, wherein the traffic channel between the mobile terminal and the synchronous CDMA base station is established using the starting point of the hard handoff, the long code state at the starting point of the hard handoff, the offset index of the pilot PN sequence, the code channel index used in the forward traffic channel, and the offset value regarding the traffic channel.

7. The hard handoff method of claim 6, wherein the starting point of the hard handoff is determined by calculating how many frames of the common pilot channel have passed at the asynchronous CDMA base station from the moment when the mobile terminal receives the information.

8. A mobile terminal capable of performing a hard handoff from an asynchronous CDMA base station to a synchronous CDMA base station, comprising:
circuit configured to receive asynchronous CDMA channels including an asynchronous CDMA synchronization channel and an asynchronous CDMA common pilot channel from the synchronous CDMA base station, while being in communication with the asynchronous CDMA base station;
circuit configured to report a measured result to the asynchronous CDMA base station on the basis of each intensity of the asynchronous CDMA channels received from the synchronous CDMA base station and the asynchronous CDMA base station, wherein the measured result is used in order for the asynchronous CDMA base station to transmit a handoff request message to the synchronous CDMA base station which subsequently transmits a handoff information to the asynchronous CDMA base station; and
circuit configured to perform the hard handoff to the synchronous CDMA base station by using the handoff information which is received from the asynchronous CDMA base station through a traffic channel.

9. In a dual mode mobile terminal which selectively operates in a synchronous CDMA or an asynchronous CDMA, a hard handoff method from an asynchronous CDMA base station to a synchronous CDMA base station, comprising:
measuring an intensity of an asynchronous CDMA common pilot signal generated from the synchronous CDMA base station to be handed off and an intensity of an asynchronous common pilot signal generated from the communicated with asynchronous CDMA base station; and
sending the measured intensity of the asynchronous CDMA common pilot channel to an asynchronous CDMA base station that is in communication with the mobile terminal for deciding a handoff to the synchronous CDMA base station.

10. A CDMA telecommunication system having synchronous and asynchronous systems, the CDMA telecommunication system comprising:
an asynchronous CDMA base station operating in a 3G asynchronous CDMA network; and
a synchronous CDMA base station operating in a 2G asynchronous CDMA network, wherein the synchronous CDMA base station;
a) transmits asynchronous CDMA channels including an asynchronous CDMA synchronization channel and an asynchronous CDMA common pilot channel to the mobile terminal communicated with the asynchronous CDMA base station for synchronizing a handoff time at the synchronous CDMA base station, wherein the synchronous CDMA base station further transmits synchronous CDMA channels to other mobile terminal; and
b) transmits an information to the asynchronous CDMA base station when the synchronous CDMA base station which receives the handoff request message from the asynchronous CDMA base station.

11. A synchronous CDMA base station operating in a 2G asynchronous CDMA network, wherein the synchronous CDMA base station:
a) transmits asynchronous CDMA channels including an asynchronous CDMA synchronization channel and an asynchronous CDMA common pilot channel to the mobile terminal communicated with the asynchronous CDMA base station for synchronizing a handoff time at the synchronous CDMA base station, wherein the synchronous CDMA base station further transmits synchronous CDMA channels to other mobile terminal; and
b) transmits an information to an asynchronous CDMA base station when the synchronous CDMA base station which receives a handoff request message from the asynchronous CDMA base station.

* * * * *